United States Patent
Xu

(10) Patent No.: US 7,948,719 B2
(45) Date of Patent: May 24, 2011

(54) SOLID STATE CIRCUIT PROTECTION SYSTEM THAT WORKS WITH ARC FAULT CIRCUIT INTERRUPTER

(75) Inventor: Jian Xu, Windsor (CA)

(73) Assignee: Masco Corporation, Taylor, MI (US)

( * ) Notice: Subject to any disclaimer, the term of this patent is extended or adjusted under 35 U.S.C. 154(b) by 239 days.

(21) Appl. No.: 12/251,651

(22) Filed: Oct. 15, 2008

(65) Prior Publication Data

US 2010/0091418 A1 Apr. 15, 2010

(51) Int. Cl.
*H01H 9/30* (2006.01)
*H01H 9/56* (2006.01)
*H01H 73/18* (2006.01)
*H02H 3/00* (2006.01)
*H02H 7/00* (2006.01)

(52) U.S. Cl. ............ 361/13; 361/2; 361/5; 361/8

(58) Field of Classification Search ............ 361/2, 5, 361/8, 13
See application file for complete search history.

(56) References Cited

U.S. PATENT DOCUMENTS

| 7,110,225 B1 | 9/2006 | Hick |
| 2005/0012395 A1 | 1/2005 | Eckroad |
| 2009/0168273 A1* | 7/2009 | Yu et al. ............ 361/13 |

FOREIGN PATENT DOCUMENTS

| EP | 2053741 | 4/2009 |
| JP | 10031924 | 2/1998 |
| WO | 9519659 | 7/1995 |

OTHER PUBLICATIONS

International Search Report mailed Jul. 20, 2010.

* cited by examiner

*Primary Examiner* — Stephen W Jackson
*Assistant Examiner* — Dharti H Patel
(74) *Attorney, Agent, or Firm* — Carlson, Gaskey & Olds PC

(57) ABSTRACT

An electric circuit includes a load, a solid state device, and a control for opening the circuit such that current will not flow through the solid state device, and for facilitating flow of current to bypass said solid state device and provide a current path to an arc fault circuit interrupter. A bypass includes a normally opened switch which is closed to provide current to the arc fault circuit interrupter.

6 Claims, 3 Drawing Sheets

SOLID STATE CIRCUIT PROTECTION SYSTEM THAT WORKS WITH ARC FAULT CIRCUIT INTERRUPTER

BACKGROUND OF THE INVENTION

This application relates to an electric circuit wherein a protection device for a solid state circuit element is incorporated into a circuit, which works in harmony with an arc fault circuit interrupter ("AFCI").

In modern buildings, more electrical safety measures are being required. Recently, AFCIs have been required in building electric systems. An AFCI acts to disable an electric circuit should specific current patterns be detected. These patterns could include arcing and sparking resulting from a short-circuit. Once these patterns are recognized, the AFCI unit will de-energize the circuit. AFCI units typically de-energize a circuit within a mini-second timeframe.

Solid state circuit elements are being incorporated to control the electric systems. Such solid state devices also need to be protected from a short-circuit current. In fact, a solid state device must be protected more quickly than the AFCI will de-energize the circuit. As an example, after a micro-second range, a solid state device could be damaged.

SUMMARY OF THE INVENTION

In a disclosed embodiment of this invention, an electric circuit is provided with a solid state device having a protection switch. When the protection switch is closed, a parallel electric line which bypasses the solid state device is closed such that the circuit does supply the current to the AFCI, and such that the AFCI can act to de-energize the circuit.

These and other features of the present invention can be best understood from the following specification and drawings, the following of which is a brief description.

DETAILED DESCRIPTION OF THE PREFERRED EMBODIMENT

Figure 1:
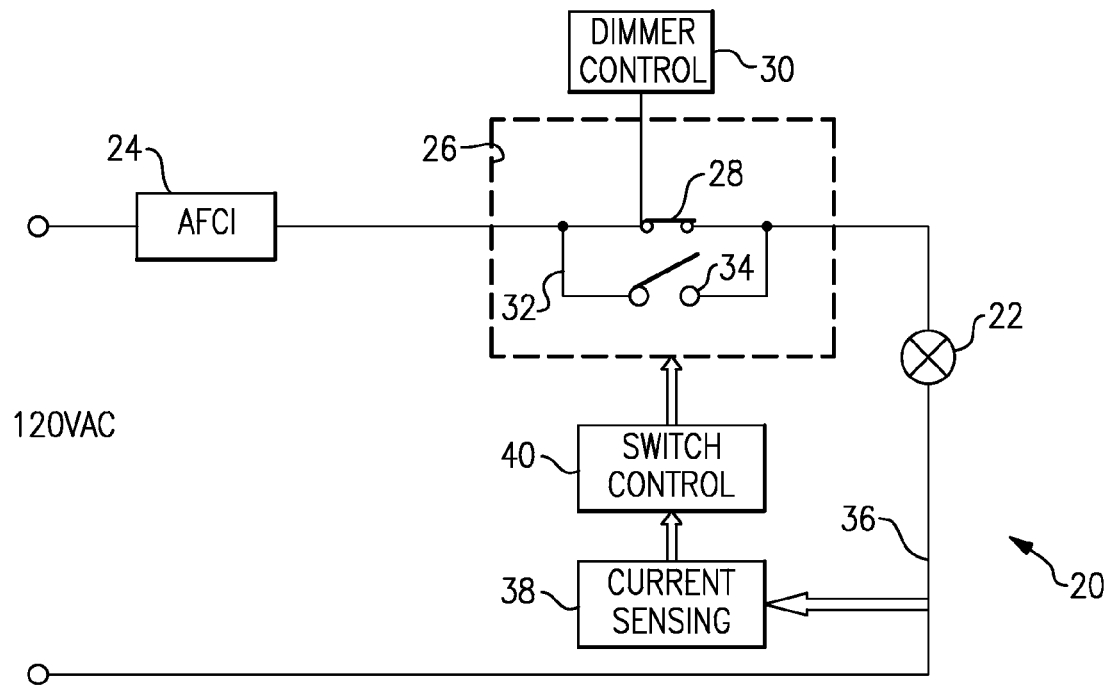
FIG. 1 is a schematic view of an electric circuit in a normal operation mode.

An electric circuit 20 is illustrated in FIG. 1. The electric circuit 20 is shown for powering a light bulb 22. While light bulb 22 is shown, electric circuits for powering any number of items could benefit from this invention. An AFCI 24 may be a standard item and is incorporated into the circuit. The AFCI will operate to detect an arc fault or other short-circuit predictors and will de-energize the circuit when such an occurrence is detected. A control 26 includes a MOSFET implemented bi-directional switch 28. This switch 28 is part of an overall control 30 for providing dimming of the power delivered to the light bulb 22. One such dimmer circuit is disclosed in U.S. patent application Ser. No. 11/684,834, entitled "Dimming Circuit for Controlling Electrical Power," filed on Mar. 12, 2007. While the solid state device is shown as a MOSFET switch, other solid state devices can benefit from this invention. Moreover, dimmer circuits other than the specifically disclosed dimmer circuit (see FIG. 4) can also benefit from this application.

Figure 2:
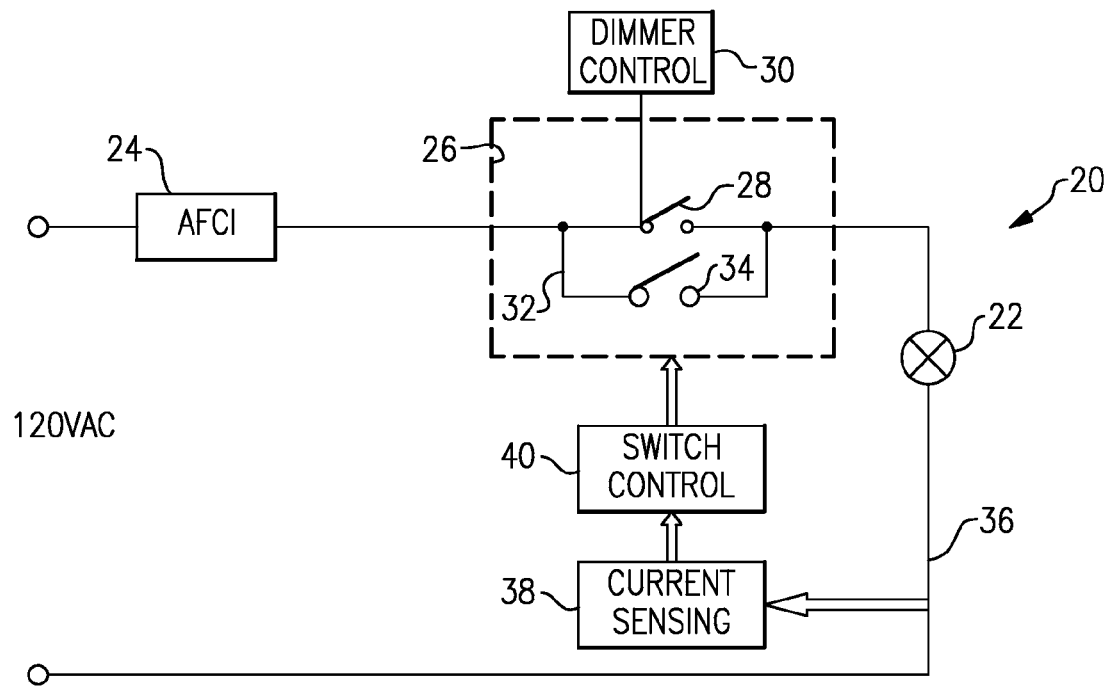
FIG. 2 shows a first step in addressing a short circuit.
Figure 3:
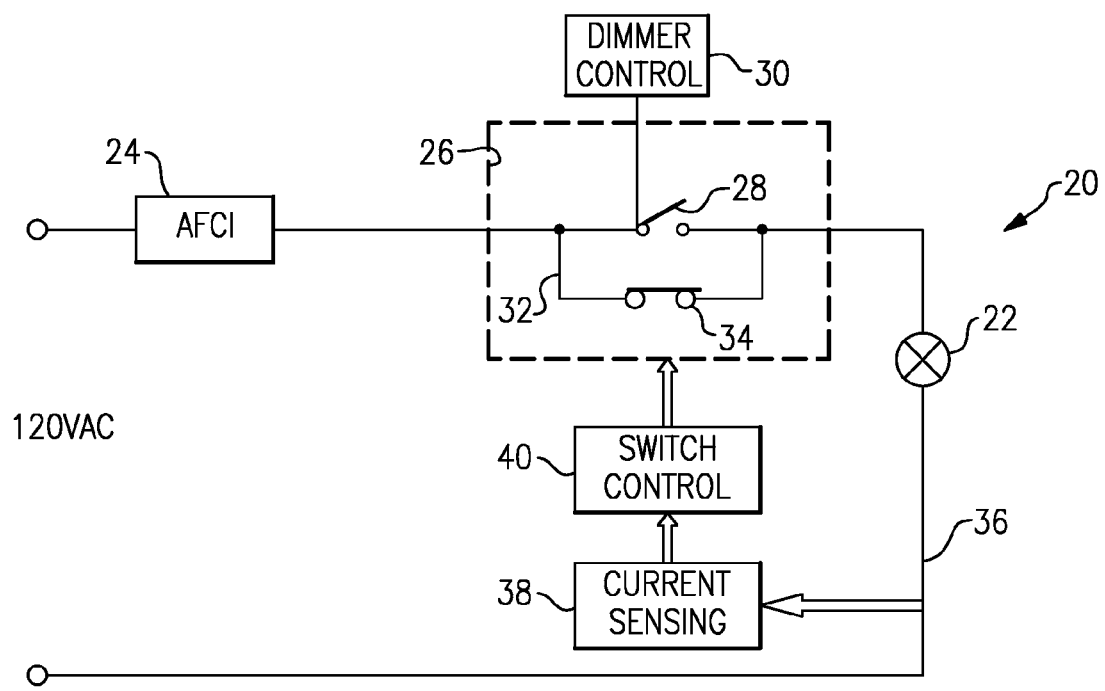
FIG. 3 shows a subsequent step.

The MOSFET 28 is provided with a parallel bypass line 32 having its own electromechanical bi-directional switch 34. A line 36 downstream of the light bulb 22 communicates to a current sensing control 38. The current sensing control communicates with a switch control 40. When an undesirably high current is sensed, the switch control 40 acts to control the switches 28 and 34, as shown in FIGS. 2 and 3. Initially, and during normal operation as shown in FIG. 1, the switch 28 is controlled by a power width modulation (PWM) signal and the switch 34 is opened.

As a first step shown in FIG. 2, when an unusually high current is sensed, the switch 28 is opened. At this point, the switch 34 remains open. This now protects the solid state device 28, and the remainder of the dimming circuit 30. Soon thereafter, and as shown in FIG. 3, the switch 34 is closed. Now, the current can continue to flow to the AFCI 24, and the AFCI 24 can act as designed to protect the remainder of the circuit.

In this manner, the solid state device is protected while the AFCI is still allowed to perform its function.

Figure 4:
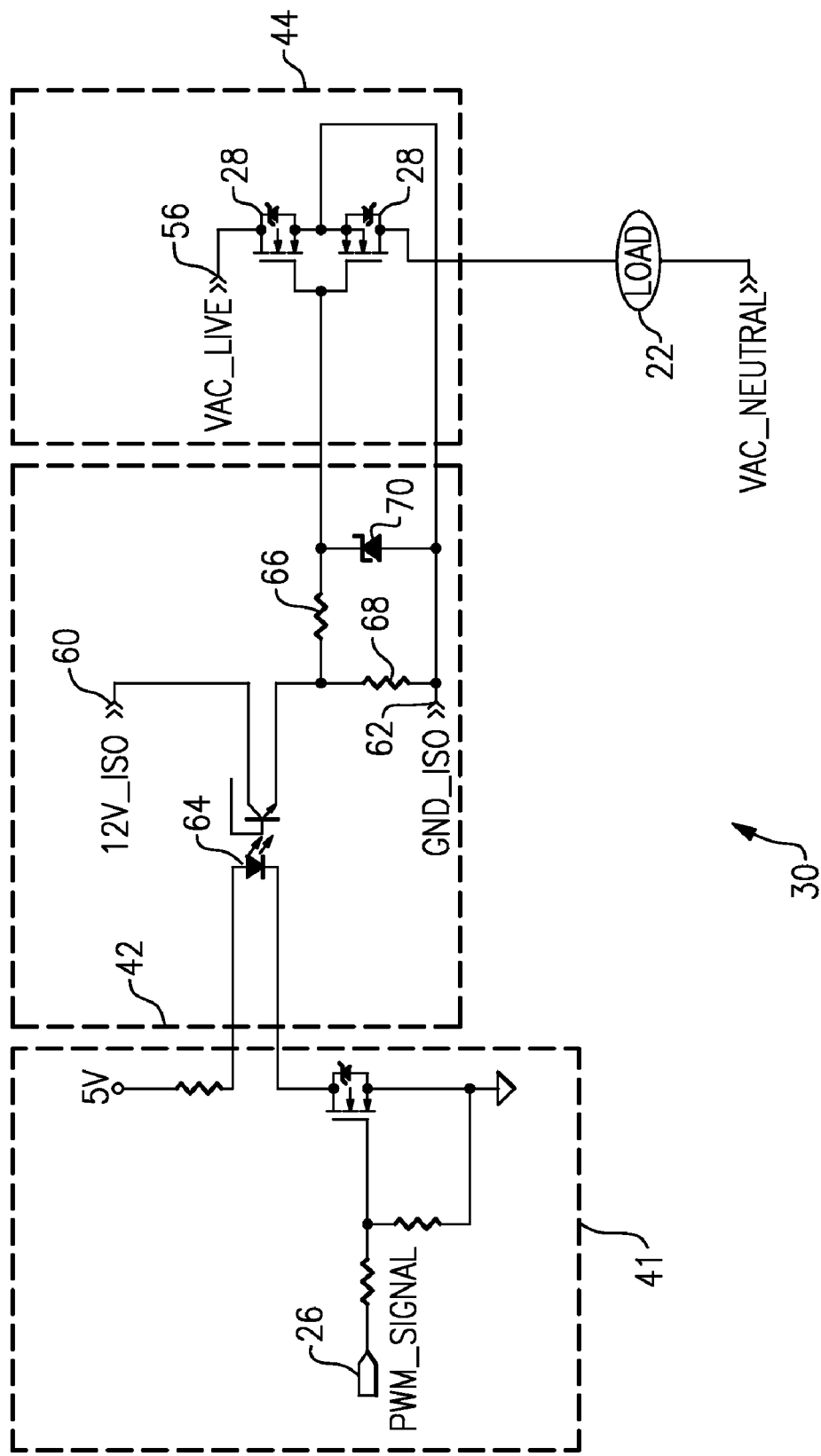
FIG. 4 shows a sample dimmer circuit.

A sample dimmer circuit is shown in FIG. 4. Notably, the sample dimmer circuit 30 as shown in FIG. 4 includes two MOSFETS 28. The circuit of this application can have redundant bypass lines and switches associated with each of the MOSFETS. The microcontroller 30 provides a timing control signal input to the timing portion 41. The timing control signal in one example comprises a pulse width modulation control signal. The timing control signal controls when the dimming portion 42 activates the MOSFET switches 46 of the power train portion 44 to control the amount of power supplied to a load 52. The microcontroller 26 determines how to set the timing control signal based upon what setting a user selects (e.g., what dimming level is desired). In one example, the microcontroller 30 uses known techniques for providing the pulse width modulation input to achieve a desired corresponding amount of dimming.

In the illustrated example, the power train portion 44 includes the MOSFETs 28 because they are efficient for certain power levels (e.g., up to about 600W). Another example is useful with higher powers and includes an IGBT in place of the MOSFETs 28.

One example load 22 is a light bulb. Controlling the light intensity of a bulb is one example use of the illustrated arrangement. In this example, the load 50 is plugged into a wall socket having terminals schematically represented at 52 and 54.

The MOSFETs 28 in one example operate according to a known reverse phase control strategy when the gate and source of each is coupled with a sufficient voltage to set the MOSFETs 28 into an operative state (e.g., turn them on) so that they allow power from a source 56 (e.g., line AC) to be supplied to the load 50. In the reverse phase control example, the MOSFETs 28 are turned on at 0 volts and turned off at a high voltage. In another example a forward phase control strategy is used where the MOSFETs 28 turn on at a high voltage and off at 0 volts. Another example includes turning the MOSFETs 28 on at a non-zero voltage and turning them off at another non-zero voltage.

The dimming portion 42 controls when the power train portion 44 is on and, therefore, controls the amount of power provided to the load 22. Controlling the amount of power provided to a light bulb controls the intensity of light emitted by the bulb, for example.

In this example, an isolated DC voltage source 60 is selectively coupled directly to the gate and source of the MOSFETs 28 for setting them to conduct for delivering power to the load. The isolated DC voltage source 60 has an associated floating ground 62. A switch 64 responds to the timing control signal input 26 from the microcontroller and enters an operative state (e.g., turns on) to couple the isolated DC voltage source 60 to the MOSFETs 28. In the illustrated example, the switch 64 comprises an opto-coupler component. Other examples include a relay switch or a transformer component for selectively coupling the isolated DC voltage source 60 to the MOSFETs 28.

In one example, the isolated DC voltage source 60 provides 12 volts. In another example, a lower voltage is used. The voltage of the isolated DC voltage source 60 is selected to be sufficient to turn on the MOSFETs 46 to the saturation region.

One example includes using an isolated DC-DC converter to achieve the isolated DC voltage source 60. Another example includes a second-stage transformer. Those skilled in the art who have the benefit of this description will realize what components will work best for including an isolated DC voltage source in their particular embodiment.

The illustrated example includes voltage controlling components for controlling the voltage that reaches the gate and source of the MOSFETs 28. The illustrated example includes resistors 66 and 68 and a zener diode 70. The resistor 66 sets the turn on speed or the time it takes to turn on the MOSFETs 28. The resistors 66 and 68 set the turn off speed or the time it takes to turn off the MOSFETs 28. In one example, the resistor 68 has a much higher resistance compared to that of the resistor 66 such that the resistor 68 effectively sets the turn off time for the MOSFETs 28. Selecting an off speed and on speed allows for avoiding oscillation of the MOSFETs 28 and avoiding generating heat if the MOSFETs 28 were to stay in a linear operation region too long.

The zener diode 70 provides over voltage protection to shield the MOSFETs from voltage spikes and noise, for example. The zener diode 70 is configured to maintain the voltage provided to the MOSFET gate and source inputs at or below the diode's reverse breakdown voltage in a known manner. One example does not include a zener diode.

One advantage to the disclosed example is that the MOSFETs can be fully controlled during an entire AC cycle without requiring a rectifier. The disclosed example is a more efficient circuit arrangement compared to others that relied upon RC circuitry and a rectifier for controlling the MOSFETs.

As mentioned above, while a detailed description has been given of the FIG. 4 circuit, this invention is not limited to any particular circuit.

Also, while bi-directional switches are disclosed for AC applications, uni-directional switches can be used, as an example for DC applications, say for LED lighting.

In general, it may often be in practice that the AFCI is incorporated into an existing circuitry within a building, and that the present invention would be incorporated as a solid state circuit protection system, which is connected into the existing building circuit having the AFCI.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric circuit to be used with an arc fault circuit interrupter including:
   a load;
   a first switch controlling a flow of current along a primary current path from a power source to the load, wherein the first switch is a solid state switch;
   a second switch connected in parallel to the first switch, the second switch facilitating a flow of current along a secondary current path to bypass the first switch; and
   an arc fault circuit interrupter device upstream of the first switch and the second switch, wherein the secondary switch enables the arc fault circuit interrupter device to detect an arc fault condition downstream of the first switch and the second switch via the secondary current path.

2. The electric circuit as set forth in claim 1, wherein the second switch is normally OFF, but is turned ON when an undesirably high current is sensed downstream of the first switch and the second switch.

3. The electric circuit as set forth in claim 2, wherein the second switch is turned ON after said the first switch is turned OFF.

4. The electric circuit as set forth in claim 2, wherein the first switch includes a MOSFET.

5. The electric circuit as set forth in claim 2, wherein a current sensor senses whether a current flowing to the load is undesirably high, and commands a switch control to control the first switch and the second switch to cause current to bypass the first switch along the secondary current path.

6. An electric circuit including:
   a load;
   an arc fault circuit interrupter;
   a solid state device;
   a switch for turning OFF such that current will not flow through said solid state device, and for facilitating flow of current to bypass said solid state device and provide a current path to enable the arc fault circuit interrupter to detect an arc fault condition downstream of the solid state device;
   said bypass line includes a switch which is normally OFF, but which is turned ON when an undesirably high current is sensed, wherein the solid state device and the switch are downstream of the arc fault circuit interrupter;
   said switch on said bypass line is turned ON after said switch for said solid state device is turned OFF;
   said switch for said solid state device is a bi-directional switch;
   said solid state device is a MOSFET; and
   a current sensor senses current on the electric circuit and communicates with a switch control which controls said switch and said solid state device.

* * * * *